United States Patent
Chen et al.

(10) Patent No.: US 8,443,234 B2
(45) Date of Patent: May 14, 2013

(54) BIOS REFRESH DEVICE AND METHOD USING THE SAME

(75) Inventors: Guo-Yi Chen, Shenzhen (CN);
Hai-Qing Zhou, Shenzhen (CN);
Jian-Chun Pan, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 281 days.

(21) Appl. No.: 12/985,348

(22) Filed: Jan. 6, 2011

(65) Prior Publication Data
US 2012/0089870 A1   Apr. 12, 2012

(30) Foreign Application Priority Data
Oct. 8, 2010   (CN) ............................ 2010 1 0299559

(51) Int. Cl.
*G06F 11/00*   (2006.01)
(52) U.S. Cl.
USPC ............................... 714/36; 439/188; 439/638

(58) Field of Classification Search .................... 714/30, 714/36; 713/1, 2; 439/70, 188, 638
See application file for complete search history.

(56) References Cited

U.S. PATENT DOCUMENTS

| | | | |
|---|---|---|---|
| 2001/0049783 A1* | 12/2001 | Chen | 713/1 |
| 2005/0099768 A1* | 5/2005 | Love | 361/686 |
| 2008/0098210 A1* | 4/2008 | Pan | 713/2 |
| 2009/0217102 A1* | 8/2009 | Co | 714/42 |

* cited by examiner

*Primary Examiner* — Yolanda L Wilson
(74) *Attorney, Agent, or Firm* — Altis Law Group, Inc.

(57) ABSTRACT

A BIOS refresh device includes a first socket, a second socket, and a jumper. The first socket includes a first elastic contact, a first voltage contact, and a first ground contact. The second socket includes a second elastic contact, a second voltage contact, and a second ground contact. The jumper includes a first pin, a second pin, a third pin, and a fourth pin. The first pin is electronically connected with the second elastic contact. The second pin is electronically connected with the first voltage contact or the second voltage contact. The third pin is electronically connected with the first elastic contact. The fourth pin is electronically connected with the second ground contact or the second ground contact.

10 Claims, 6 Drawing Sheets

BIOS REFRESH DEVICE AND METHOD USING THE SAME

BACKGROUND

1. Technical Field

The present disclosure relates to a basic input/output system (BIOS) refresh device and a method using the same.

2. Description of Related Art

Basic input/output system (BIOS) software is used by some computers, and is often the first code run by the computers when they are powered on. The primary function of the BIOS is to load and start an operating system. Some motherboards are provided with dual BIOS chip to avoid failure of a single BIOS chip. However, the dual BIOS chip may be simultaneously destroyed due to pulse voltage or electrostatic discharge (ESD). Furthermore, motherboards having the dual BIOS chip are costly.

DETAILED DESCRIPTION

Figure 1:
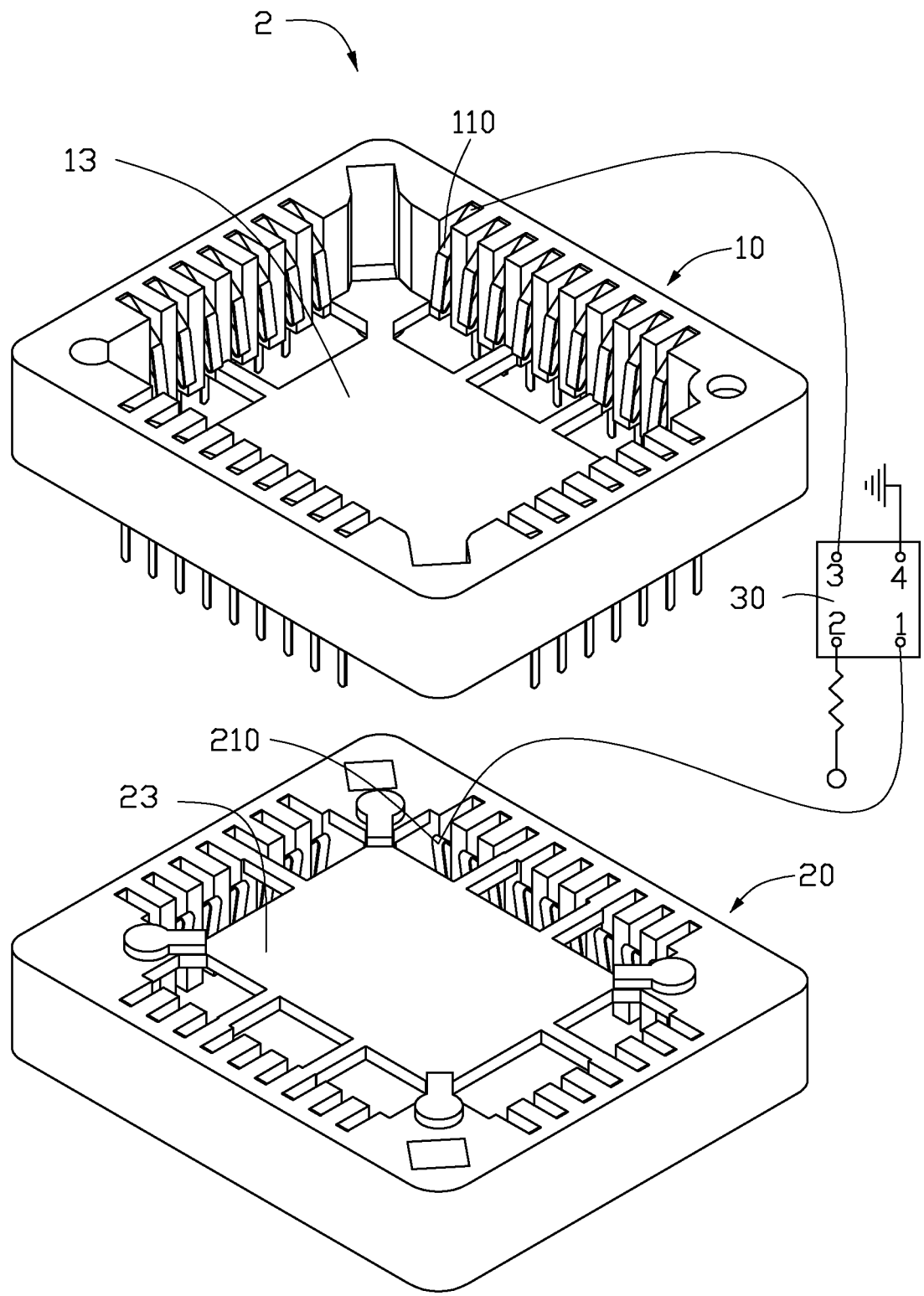
FIG. 1 is an exploded view of one embodiment of a BIOS refresh device.

FIG. 1 is an exploded view of one embodiment of a BIOS refresh device 2. The BIOS refresh device 2 includes a first socket 10, a second socket 20, and a jumper 30. The jumper 30 is connected between the first socket 10 and the second socket 20. The first socket 10 includes a first bottom 13, a first elastic contact 110, a first voltage contact (not marked), and a first ground contact (not marked). The second socket 20 includes a second bottom 23, a second elastic contact 210, a second voltage contact (not marked), and a second ground contact (not marked).

Figure 2:
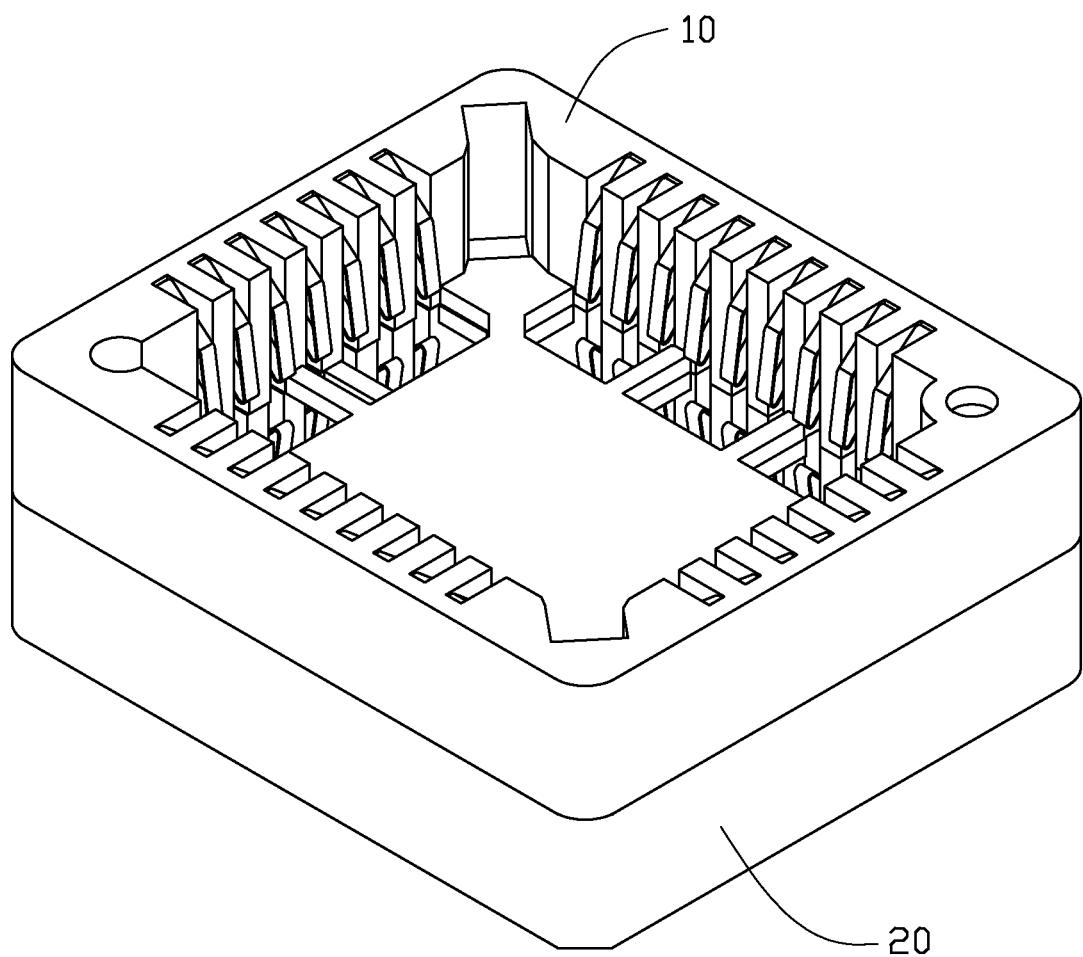
FIG. 2 is an assembly view of the BIOS refresh device of FIG. 1

FIG. 2 is an assembly view of the BIOS refresh device 2 of FIG. 1. The first socket 10 is mounted on the second socket 20, and the first bottom 13 is connected with the second bottom 23.

Figure 3:
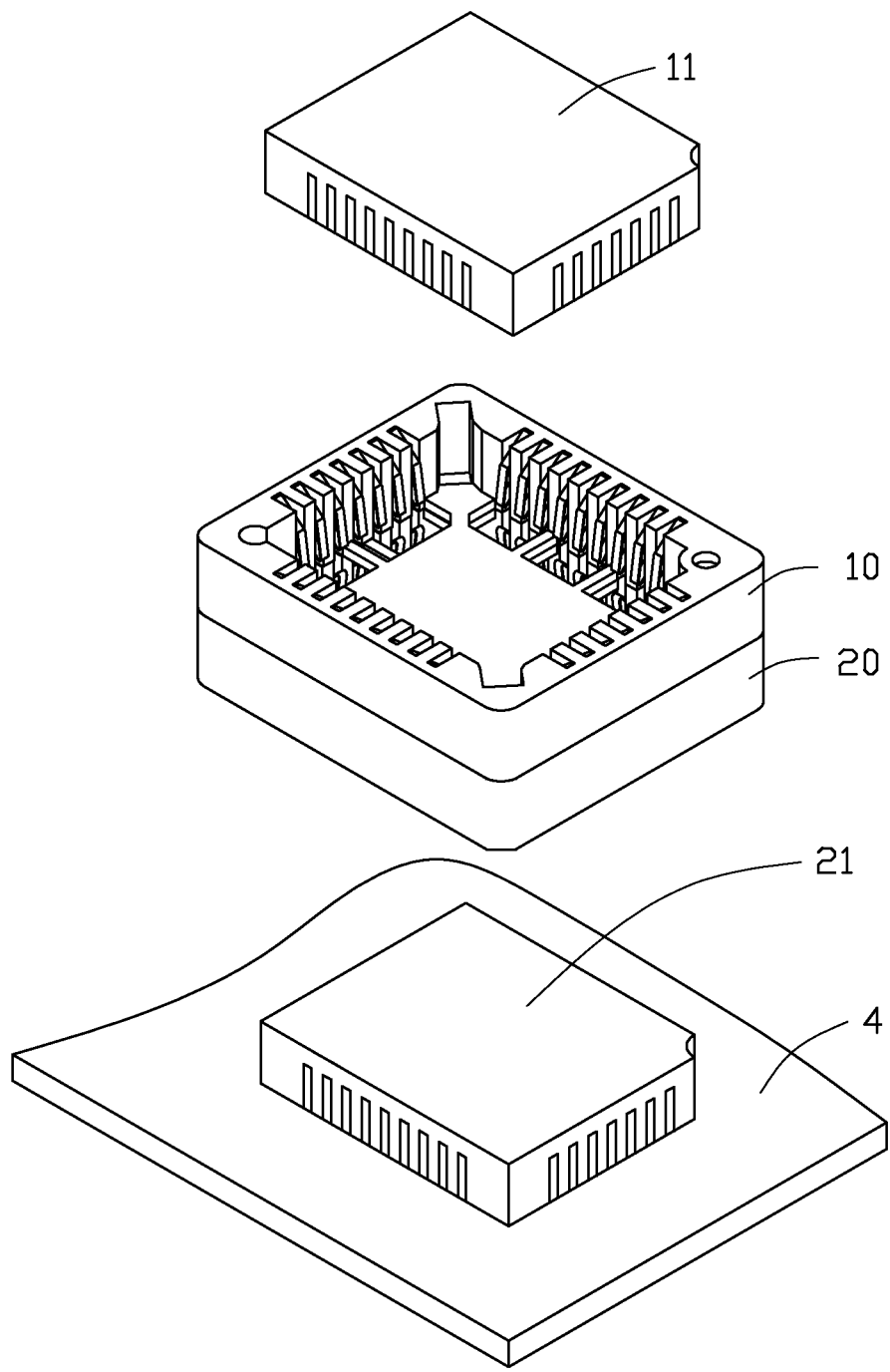
FIG. 3 is a perspective view of one embodiment of a first BIOS chip, a second BIOS chip, and the BIOS refresh device of FIG. 2.

FIG. 3 is a perspective view of one embodiment of a first BIOS chip 11, a second BIOS chip 21, and the BIOS refresh device 2 of FIG. 2. The second BIOS chip 21 is mounted on a motherboard 4 of a computer (not shown). An operating system (OS) and a BIOS refresh program are installed in the computer. The first socket 10 receives the first BIOS chip 11, and the second socket 20 connects with the second BIOS chip 21. In the embodiment, the first BIOS chip 11 is defined as a slave BIOS, and the second BIOS chip 21 is defined as a master BIOS.

Figure 4:
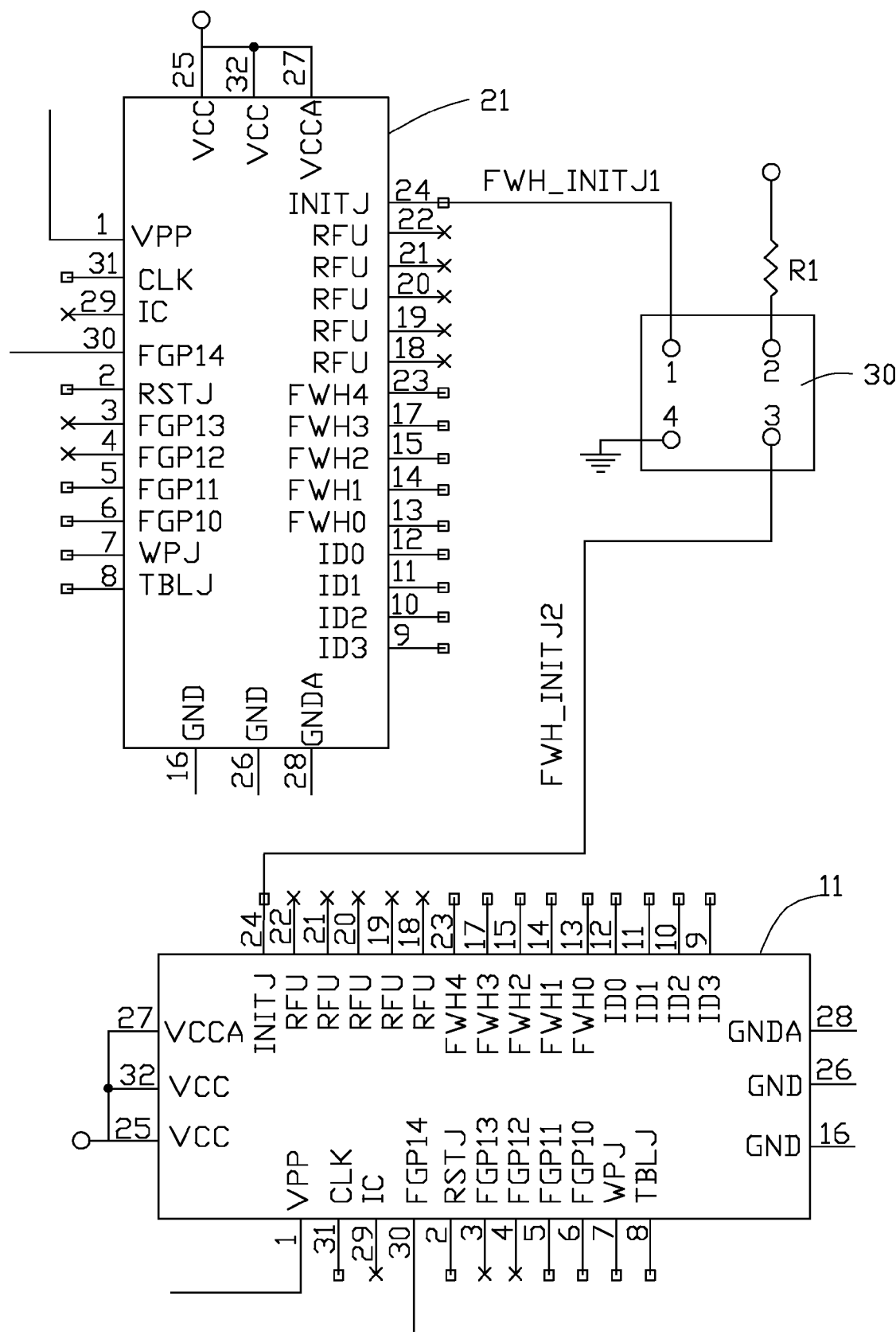
FIG. 4 is a circuit diagram of one embodiment of a first BIOS chip and a second BIOS chip connecting with a jumper of FIG. 1.

FIG. 4 is a circuit diagram of one embodiment of the first BIOS chip 11 and the second BIOS chip 21 connecting with the jumper 30 of FIG. 1. Referring to FIG. 1, the jumper 30 includes a first pin 1, a second pin 2, a third pin 3, and a fourth pin 4. The first pin 1 is electronically connected with the second elastic contact 210. The second pin 2 is electronically connected with the first voltage contact or the second voltage contact through a resistor R1. In the embodiment, the resistor R1 is 100 ohms The third pin 3 is electronically connected with the first elastic contact 110. The fourth pin 4 is electronically connected with the second ground contact or the second ground contact.

The first elastic contact 110 is electronically connected with an INITJ pin of the first BIOS chip 11. The second elastic contact 210 with an INITJ pin of the second BIOS chip 21. As a result, the jumper 30 can switch control between the first BIOS chip 11 and the second BIOS chip 21.

The second pin 2 can be electronically connected with a VCC pin 25, a VCCA pin 27, or a VCC pin 32 of the first BIOS chip 11. The second pin 2 further can be electronically connected simultaneously with the VCC pin 25, the VCCA pin 27, and the VCC pin 32 of the first BIOS chip 11. The fourth pin 4 can be electronically connected with a GND pin 16, a GNDA pin 26, or a GND pin 28 of the first BIOS chip 11. The fourth pin 4 further can be electronically connected simultaneously with the GND pin 16, the GNDA pin 26, and the GND pin 28 of the first BIOS chip 11.

The second pin 2 can be electronically connected with a VCC pin 25, a VCCA pin 27, or a VCC pin 32 of the second BIOS chip 21. The second pin 2 further can be electronically connected simultaneously with the VCC pin 25, the VCCA pin 27, and the VCC pin 32 of the second BIOS chip 21. The fourth pin 4 can be electronically connected with a GND pin 16, a GNDA pin 26, or a GND pin 28 of the second BIOS chip 21. The fourth pin 4 further can be electronically connected simultaneously with the GND pin 16, the GNDA pin 26, and the GND pin 28 of the second BIOS chip 21.

The resistor R1 is configured to provide the INITJ pin of the first BIOS chip 11 and the INITJ pin of the second BIOS chip 21 with proper current. As a result, the INITJ pin of the first BIOS chip 11 and the INITJ pin of the second BIOS chip 21 can individually generate a FWH_INITJ1 signal and a FWH_INITJ2 signal.

Figure 5:
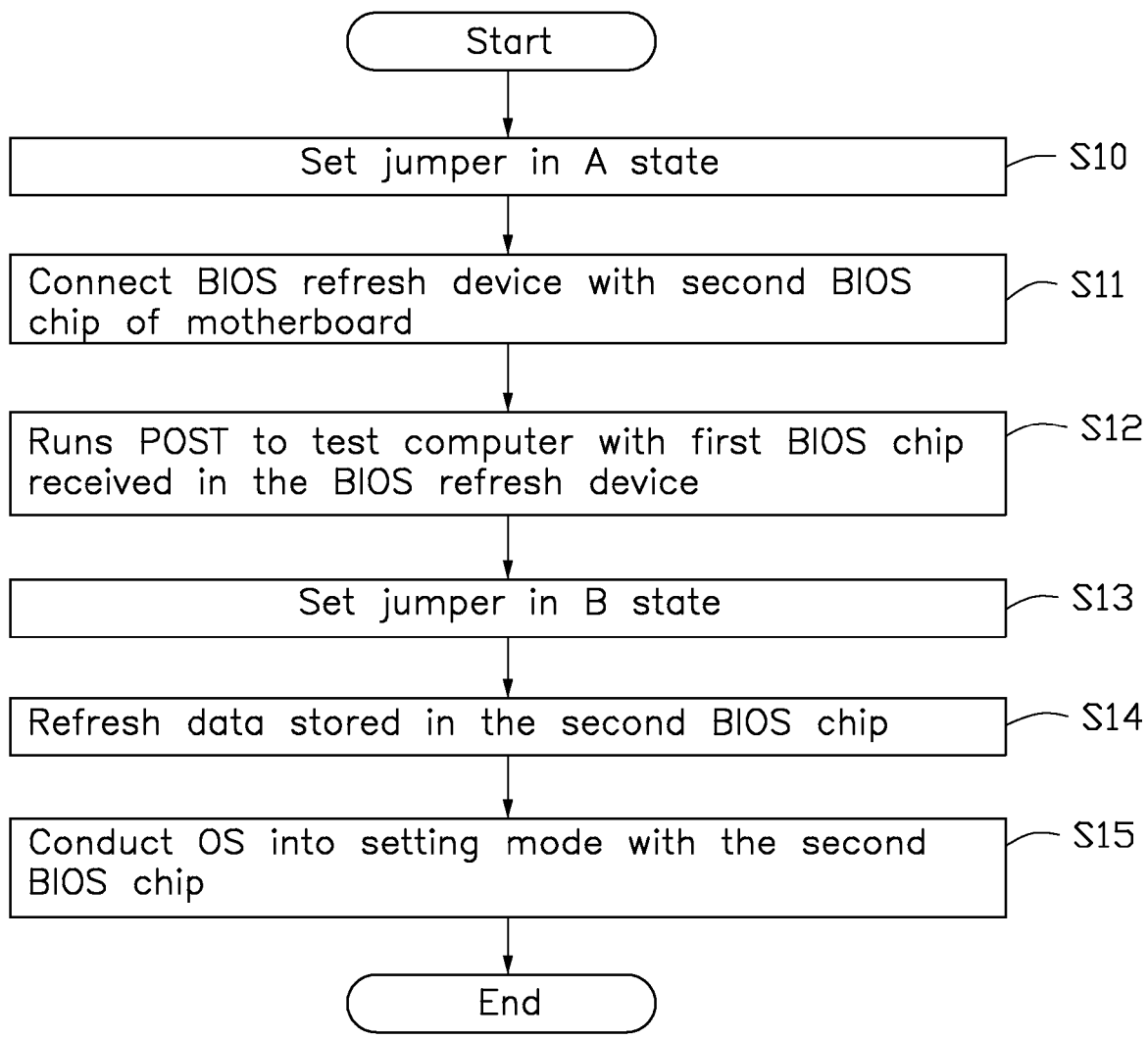
FIG. 5 is a flowchart illustrating a first embodiment of a method for using a BIOS refresh device.

In the embodiment, to refresh data stored in the first BIOS chip 11 or the second BIOS chip 21, the jumper 30 may be set in either an "A" state of a "B" state as described below:

"A" state: creating a short between the second pin 2 and the third pin 3 (2-3 short) creating a short between the first pin 1 and the fourth pin 4 (1-4 short) FWH_INIJ1=0, FWH_INIJ2=1, the first BIOS chip 11 is selected "B" state: creating a short between the first pin 1 and the second pin 2 (1-2 short) creating a short between the third pin 3 and the fourth pin 4 (3-4 short) FWH_INIJ1=1, FWH_INIJ2=0, the second BIOS chip 21 is selected FIG. 5 is a flowchart illustrating a first embodiment of a method for using the BIOS refresh device 2. In the embodiment, the data stored in the second BIOS chip 21 is damaged, thus the BIOS refresh device 2 can refresh the data stored in the second BIOS chip 21 through the first BIOS chip 11. Depending on the embodiment, additional blocks may be added, others removed, and the ordering of the blocks may be changed.

In block S10, the jumper 30 is set in the "A" state.

In block S11, the BIOS refresh device 2 is connected with the second BIOS chip 21, and then the computer is booted.

In block S12, the first BIOS chip 11 runs a power-on self-test (POST) to test the computer.

In block S13, the first BIOS chip 11 conducts the OS into a setting mode, and then the jumper 30 is set in the "B" state. The setting mode may be DOS mode or Windows mode.

In block S14, the OS runs the BIOS refresh program, and then the BIOS refresh program refreshes the data stored in the second BIOS chip 21 based on the data stored in the first BIOS chip 11.

In block S15, the second BIOS chip 21 reboots the computer after the data stored in the second BIOS chip 21 is refreshed, and then conducts the OS into the setting mode. If the second BIOS chip 21 can normally conducts the OS into the setting mode, which means the data stored in the second BIOS chip 21 is successfully refreshed.

Figure 6:
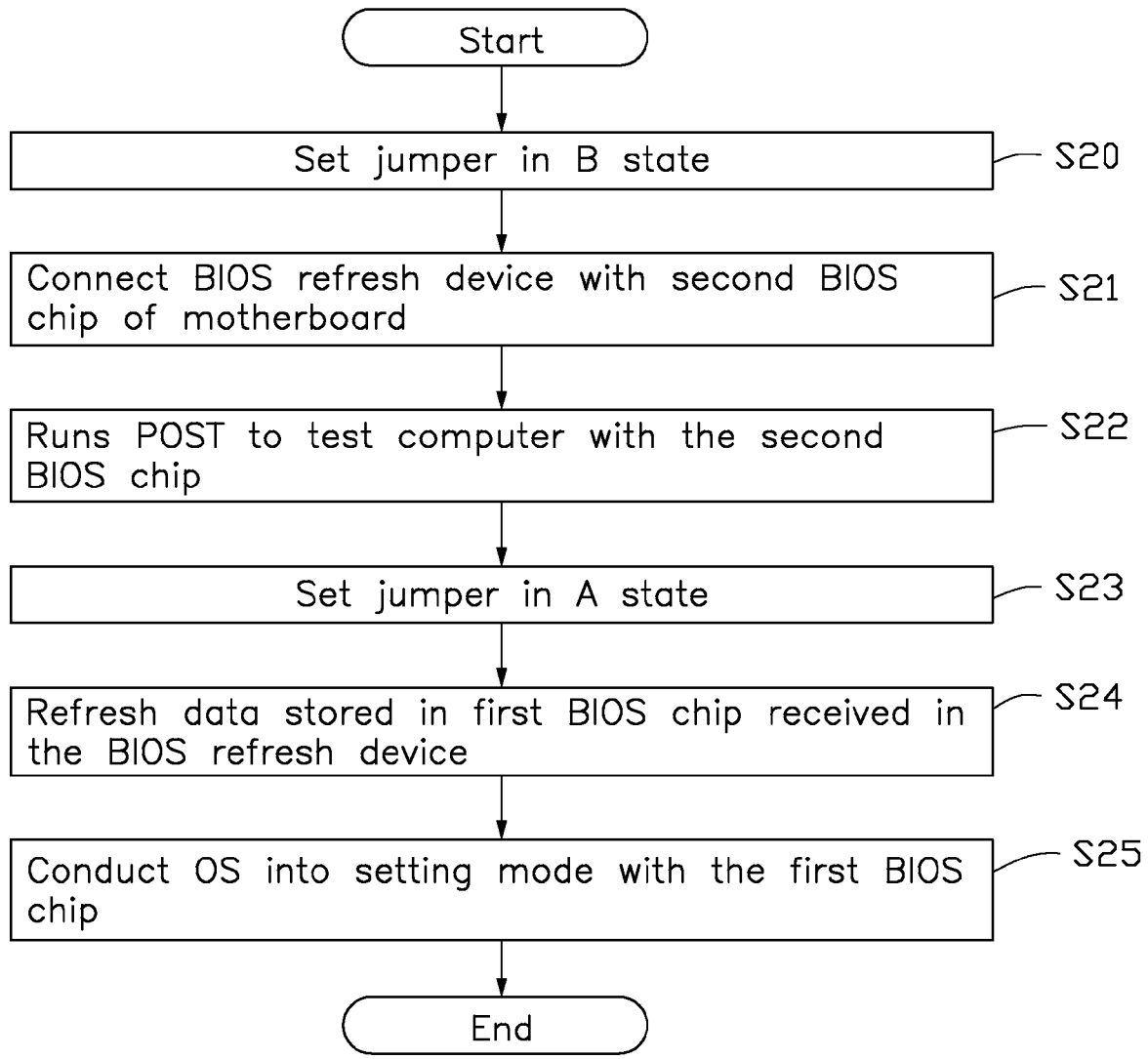
FIG. 6 is a flowchart illustrating a second embodiment of a method for using a BIOS refresh device.

FIG. 6 is a flowchart illustrating a second embodiment of the method for using the BIOS refresh device 2. In the embodiment, the data stored in the second BIOS chip 21 can backup to the first BIOS chip 11 through the BIOS refresh device 2. Depending on the embodiment, additional blocks may be added, others removed, and the ordering of the blocks may be changed.

In block S20, the jumper 30 is set in the "B" state.

In block S21, the BIOS refresh device 2 is connected with the second BIOS chip 21, and then the computer is booted.

In block S22, the second BIOS chip 21 runs a power-on self-test (POST) to test the computer.

In block S23, the second BIOS chip 21 conducts the OS into the setting mode, and then the jumper 30 is set in the "A" state.

In block S24, the OS runs the BIOS refresh program, and then the BIOS refresh program refreshes the data stored in the first BIOS chip 11 based on the data stored in the second BIOS chip 21.

In block S25, the first BIOS chip 11 reboots the computer after the data stored in the first BIOS chip 11 is refreshed, and then conducts the OS into the setting mode. If the first BIOS chip 11 can normally conduct the OS into the setting mode, that means the data stored in the second BIOS chip 21 successfully backups to the first BIOS chip 11.

The present disclosure provides a BIOS refresh device for a computer. Data stored in a BIOS of the computer can be refreshed if the data is damaged.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A basic input output system (BIOS) refresh device capable of connecting with a motherboard of a computer, comprising:
    a first socket comprising a first elastic contact, a first voltage contact, and a first ground contact;
    a second socket comprising a second elastic contact, a second voltage contact, and a second ground contact;
    a jumper comprising a first pin, a second pin, a third pin, and a fourth pin;
    wherein the first pin is electronically connected with the second elastic contact;
    wherein the second pin is electronically connected with the first voltage contact or the second voltage contact;
    wherein the third pin is electronically connected with the first elastic contact; and
    wherein the fourth pin is electronically connected with the first ground contact or the second ground contact.

2. The BIOS refresh device of claim 1, wherein the second pin is connected with the first voltage contact or the second voltage contact through a resistor.

3. The BIOS refresh device of claim 2, wherein the first socket is configured to receive a first BIOS chip, and the second socket is configured to connect with a second BIOS chip mounted on the motherboard.

4. The BIOS refresh device of claim 3, wherein the first elastic contact is electronically connected with an INITJ pin of the first BIOS chip, and the second elastic contact is electronically connected with an INITJ pin of the second BIOS chip.

5. The BIOS refresh device of claim 4, wherein the second pin is electronically connected with a pin VCC or a pin VCCA of the first BIOS chip.

6. The BIOS refresh device of claim 4, wherein the fourth pin is electronically connected with a pin GND or a pin GNDA of the first BIOS chip.

7. A computer-implemented method for refreshing data stored in the second BIOS chip using the BIOS refresh device of claim 3, comprising:
    creating a short between the second pin and the third pin, and creating a short between the first pin and the fourth pin, to select the first BIOS chip;
    booting the computer;
    running a power-on self-test (POST) through the first BIOS chip to test the computer;
    conducting an operating system (OS) installed in the computer into a setting mode through the first BIOS chip;
    creating a short between the first pin and the second pin, and creating a short between the third pin and the fourth pin, to select the second BIOS chip to refresh; and
    refreshing the data stored in the second BIOS chip based on data stored in the first BIOS chip.

8. The method of claim 7, further comprising:
    rebooting the computer through the second BIOS chip after the data stored in the second BIOS chip is refreshed; and
    conducting the OS to the setting mode through the second BIOS chip after the computer is rebooted.

9. A computer-implemented method for refreshing data stored in the first BIOS chip using the BIOS refresh device of claim 3, comprising:
    creating a short between the first pin and the second pin, and creating a short between the third pin and the fourth pin, to select the second BIOS chip;
    booting the computer;
    running a power-on self-test (POST) through the second BIOS chip to test the computer;
    conducting an operating system (OS) installed in the computer into a setting mode through the second BIOS chip;
    creating a short between the second pin and the third pin, and creating a short between the first pin and the fourth pin, to select the first BIOS chip to refresh; and
    refreshing the data stored in the first BIOS chip based on data stored in the second BIOS chip.

10. The method of claim 9, further comprising:
    rebooting the computer through the first BIOS chip after the data stored in the first BIOS chip is refreshed; and
    conducting the OS into the setting mode through the first BIOS chip after the computer is rebooted.

* * * * *